United States Patent Office 3,565,657
Patented Feb. 23, 1971

3,565,657
PROCESS FOR TREATING FURNACE CARBON BLACK
Eli M. Dannenberg, Waban, Raymond P. Rossman, Wellesley Hills, Bran B. Boonstra, Sharon, and Frank R. Williams, Squantum, Mass., assignors to Cabot Corporation, Boston, Mass., a corporation of Delaware
No Drawing. Continuation of application Ser. No. 562,924, July 5, 1966, which is a continuation of application Ser. No. 219,765, Aug. 27, 1962. This application June 19, 1967, Ser. No. 647,255
Int. Cl. C09c 1/50
U.S. Cl. 106—307                                     12 Claims

ABSTRACT OF THE DISCLOSURE

A process is described for making a furnace carbon black which is well suited for use as a reinforcing filler in relatively saturated synthetic elastomers. This process involves converting a hydrocarbon raw material to carbon black in a furnace operated so as to produce a black of relatively low structure as indicated by an oil absorption value below about 115 pounds oil per 100 pounds of black. The resultant black is then treated with a chemical oxidizing agent selected from the group consisting of nitric acid, nitrogen oxides, ozone and mixtures thereof until the pH of said black has been reduced to about 4 or below, the volatile content has been increased to about 3% by weight or more and the diphenyl quanidine uptake for a half gram sample of said black has been raised above about 25%.

---

This application is a continuation of application Ser. No. 562,924 filed July 5, 1966 which in turn is a continuation of application Ser. No. 219,765 filed Aug. 27, 1962, both now abandoned.

This invention relates to novel rubber compositions containing a specially produced carbon black. More particularly the invention disclosed herein relates to certain rubber compositions which exhibit improved properties because of the incorporation therein of a selectively oxidized low structure carbon black, said carbon black being characterized by a distinct combination of surface characteristics including pH within a particular range and a volatile content of definite character and amount.

The incorporation of carbon black as a reinforcing agent into rubber stocks is well known and is generally considered to be one of the fundamental factors responsible for much of the success with which rubber stocks perform in most heavy duty applications today. The improved performance exhibited by an elastomeric article or rubber stock filled with carbon black will, of course, provided it is properly cured, depend largely upon the nature of both the elastomer and the particular black incorporated therein. For example, up until about 1945, carbon blacks produced by the channel process were used almost exclusively as reinforcing agents for natural rubber. Later with the advent of the synthetic rubbers, new carbon blacks were required to impart the maximum reinforcing properties thereto and the use of furnace blacks came into vogue. Accordingly, the carbon black industry has continually worked hand in hand with the rubber industry to develop and produce new carbon blacks which, when incorporated into a particular elastomer or type of rubber, would impart the mose desirable properties thereto.

The development of satisfactory carbon blacks for some of the new synthetic rubbers has been especially complicated by the increased inertness or reduced reactivity, e.g. the more saturated nature, of many of these comparatively new synthetic elastomers presently contemplated for use as general purpose or heavy duty rubber stocks. The most notable of these newer elastomers is butyl rubber, which, for the purpose of the present invention, is defined as a rubber prepared by copolymerizing at least about 95% isobutylene with about 1 to 5% of a conjugated diolefin such as isoprene or butadiene. Other substantially saturated synthetic elastomers which are presently being contemplated for such use are the halogenated butyls as well as the newer rubbery polymers of α-monoolefins such as propylene and butene as well as copolymers of ethylene, propylene and butene and also copolymers of such aforementioned monoolefins containing amounts up to about 10% mole percent of conjugated diolefins such as isoprene and butadiene.

All of the aforementioned elastomers are generally regarded as attractive commercial rubbers because of the low amount of unsaturation contained therein and the desirable ramifications of such a property especially in a general purpose rubber. However, the ultimate realization of the practical use of these substantially saturated elastomers as commercial rubbers has been hindered by many problems, one of the most urgent of which is the fact that the incorporation of carbon black thereinto does not appear to impart the improvement in performance expected on the basis of previous experience with other rubber stocks. In butyl rubber especially, this problem has seriously restricted the use of same as a general purpose rubber. As a result, butyl rubber to date has had only limited commercial uses, chief among them being as inner tubes for tires. Extensive attempts have been made to compound a practical, serviceable, all purpose butyl rubber such as could be used for tire carcasses and treads, e.g. by heat treatment or heat interaction of the polymer-filler components of the butyl rubber composition during the compounding thereof and the use as the filler of a carbon black which had been specially treated, e.g. ball milled in the presence of air. Although some improvements have been achieved by such special measures, the finished products obtainable thereby have not yet consistently met the desired commercial requirements in wearing and abrasion-resistant qualities. Such products often tend to be deficient in regard to elastic properties, such as rebound and hysteresis, indicating poor bonding between the carbon black filler and the polymer molecules.

Accordingly, it is the principal object of the present invention to provide a carbon black especially adapted for use in many of the diverse relatively saturated synthetic rubber stocks and capable of imparting improved reinforcing properties thereto.

Still another object of the present invention is to provide a carbon black which imparts valuable improvements to the elastomeric stock in which it is incorporated, which improvements are imparted even to those elastomeric stocks which inherently possess a high degree of saturation.

Another object of the present invention is to provide such synthetic rubber compositions which have improved wear and abrasion-resistance as well as the more elasticity. Another object of this invention is to provide a butyl rubber composition having generally improved physical properties for use as a general purpose rubber.

It is still another object of this invention to provide novel butyl rubber compositions or other relatively saturated synthetic rubber compositions which contain a specially active and beneficial, treated carbon black of unusual character as can be determined by analytical testing.

These and other objects and advantages of our invention will be apparent from the detailed description and explanation which follows.

The above objects are realized in accordance with the present invention by incorporating into butyl rubbers or other such substantially saturated synthetic elastomeric stocks, a furnace carbon black which has been aftertreated at relatively low temperatures with certain oxidizing agents until the volatile content and surface acidity thereof have been substantially increased. We believe that the improved rubber properties obtained are a result of a more intimate association between the so treated black and the elastomer by virtue of the unique combination of surface chemical groups and surface characteristics of the resulting black. Accordingly, our invention is directed to relatively saturated elastomeric stocks having incorporated therein a carbon black filler having a unique combination of properties, especially specific chemical and physical surface characteristics which we have found are required to impart substantial improvements to such stocks, and to especially effective methods of producing such carbon black fillers.

More precisely our invention resides in the discovery that low temperature chemically aftertreated furnace carbon blacks having a volatile content of about 3 to 8%, a pH between about 1.5 and 4.0, a diphenylguanidine uptake hereinafter referred to as D.P.G. of about 25 to 90 percent for a 0.5 gram sample of the black, and an acid number below about 14, impart surprisingly outstanding properties to substantially saturated elastomeric compositions. Included among the low temperature active, chemical reagents which are effective in imparting the above-mentioned properties are ozone, nitric oxides, and especially nitric acid or nitric oxides in the presence of moisture.

In one aspect of our invention, we have found that an especially desirable filler for butyl rubber stocks is obtained by the low-temperature chemical treatment of low structure (or low modulus) oil furnace blacks and that, for all practical purposes, the above-mentioned combination of surface characteristics can only be imparted to such blacks by the reaction thereof with the chemical oxidizing agents such as those aforementioned, which are more active than air or molecular oxygen and operate effectively at temperatures at which air or molecular oxygen do not react sufficiently to produce any significant effect on such blacks. For the purposes of the present invention, low structure (or low modulus) oil furnace blacks include those blacks which, when characterized by an average electron microscope particle diameter of the order of about 15 to about 35 millimicrons, have an oil absorption factor below about 115 pounds of oil per hundred pounds of black. Included in such low structure blacks and most especially preferred for some applications are a species of furnace blacks which are comparatively new to the art. These new blacks by virtue of their original process of production are inherently characterized by oil absorption values below about 100 in the above range of particle diameter. These preferred low structure blacks are produced in accordance with the teachings of U.S. Pats. 3,010,794 or 3,010,795, both to Friauf and Thorley, namely by introducing small concentrations of alkali metal additives into the carbon-forming zone of the furnace. U.S. Pat. 3,010,794 is directed specifically to the use of alkali metals having an atomic number of at least 19 in concentrations of at least about 1 p.p.m., and preferably between about 10 and about 1000 p.p.m., of carbon black being produced. Accordingly, although any of the low-temperature chemically oxidized furnace blacks of the present invention impart desirable improvements to substantially saturated elastomeric stocks, a particularly preferred embodiment of the present invention embraces compositions of butyl rubber containing a low-temperature chemically oxidized furnace black of inherently low structure by virtue of the original process by which it was made.

The oxidation of carbon blacks, whether they be channel blacks or furnace blacks, is rather well known and may be accomplished by many methods. One of the oldest and best known methods is by high temperature aftertreatment in air. In this method, a black is heated to temperatures of at least about 1000° F. and usually somewhat higher in the presence of air. Such air aftertreatment increases percent volatiles and decreases pH but simultaneously reduces particle size significantly and increases surface area even more drastically due to pore formation, etc. Recently it has been discovered that the increase in surface area and pore formation due to air aftertreatment can be limited somewhat by generating the required heat by mechanical attrition, e.g. by ball milling the blacks in the presence of air. Such mechanical attrition processes have also been shown to be more effective than ordinary air aftertreatment in destroying secondary agglomerates of the black and thereby reducing structure.

In contrast to such air oxidation processes, we have found that oxidation of new blacks with chemical oxidizing agents at low temperatures, e.g. below about 350° F. and preferably below 300° F. merely increases percent volatiles and lowers pH while causing litle or no change in surface area or structure properties of the black so treated. We have found that blacks, especially blacks of inherently low structure, which have been subjected to chemical oxidation at low temperatures are surprisingly superior reinforcing agents for substantially saturated elastomers. For example, such chemically oxidized blacks greatly improve tensile, modulus, rebound, hysteresis and other such properties of the vulcanizates in which they are utilized as reinforcing agents.

We are unable to explain precisely why such superior reinforcing properties are obtained with the blacks produced in accordance with the teachings of the present invention. According to a hypothesis which we have postulated but to which we do not wish to be bound, we believed that the particular combination of chemical groups which is obtained by our low temperature chemical oxidation either cannot be obtained by mechanical attrition and/or other air or molecular oxygen oxidation processes or at least cannot be obtained thereby without an attendant significant increase in surface area and/or significant reduction in structure properties. We have found that the increase in surface area together with the reduction of structure properties which is inherently encountered in such prior art processes tend to make the resultant blacks extremely difficult to disperse in saturated elastomeric stocks. Hence, said blacks cannot effectively impart the maximum reinforcing properties to such stocks. Moreover, the problem of dispersibility is especially aggravated if the original black involved was already inherently of the low modulus or low structure type. In contrast thereto, the oxidation of furnace blacks by means of low temperature active chemical oxidizing agents, especially at the moderate temperatures which we prefer, does not effect any significant increase in surface area or any significant decrease in structure properties of the blacks so treated. Thus, we are able to selectively and independently control the surface chemistry of any of the furnace blacks and especially the low modulus type without concomitant adverse effects upon the physical characteristics thereof so that the blacks produced in accordance with the teachings of our invention are readily dispersible in any of the substantially saturated elastomeric stocks with which we are particularly concerned herein.

In addition to the improved degree of dispersibility obtained with our blacks, other additional advantages flow from their use. One outstanding advantage is that, although it is known that mechanically attrited carbon blacks impart improved properties to butyl rubber stocks, the most significant degree of improvement is obtained only when the attrited black and elastomeric stock are separately heat cycled together during compounding. In contrast thereto, some of the blacks of our invention, especially when derived from the above-mentioned newer species of low structure blacks, are able to impart an especially satisfactory degree of improvement to a wide variety of saturated elastomeric stocks without such special heat cycling. The advantages which flow from the elimination of heat cycling will be obvious to those skilled in the art. For example, in those compositions which require heat cycling, a promoter such as "Elastopar" is often utilized to avoid the necessity of long heat cycling and/or the use of higher temperatures. Generally about 1 to 1.5 parts of the "Elastopar," which contains 33⅓% N methyl n-4-dinitrosoaniline and the remainder inert mineral filler, are charged with 100 parts of the filler-elastomer mixture in the Banbury and mixed for 2 to 3 minutes at 275° F. to 325° F. Thus, the use of such promoters and complex processing procedures can be avoided through the use of the blacks of this invention.

The chemical treatment of low structure furnace blacks with nitric acid, nitric oxides, or ozone to impart the above-mentioned critical surface characteristics thereto may be accomplished in many manners. We especially prefer nitric acid as the reactant because of the relative ease of handling, the economic advantages implicit in its use and most especially because of the more pronounced effectiveness thereof. More especially, we prefer to react aqueous nitric acid solutions with the carbon blacks of interest to the present invention. The proportion of solution to black is not especially critical but in order to achieve good reaction conditions and good distribution of the components, the amount of solution should be at least enough to completely wet the black involved. Generally complete wetting of most blacks may be achieved by the use of approximately an equal amount of acid solution by weight. Larger amounts of solution may be utilized if desired but excessive amounts of solution complicate to some extent the drying of the blacks. The time of contact of the black with the solution also is not especially critical and will depend to a large extent upon the manner in which the solution and black are mixed. We have found that the critical surface characteristics may be effectively imparted to the blacks by merely mixing same until uniformly wetted with aqueous nitric acid solutions varying in concentration from about 5% to about 50% $HNO_3$ or even somewhat higher, using proportions sufficient to provide from about 5% to about 50% or more (e.g. up to 60% as set forth in original claim 11 of parent application 219,765) $NHO_3$ by weight on the black and heating the so treated black at temperatures between about 200° F. and about 400° F. until dry. A sharp increase in volatile, e.g. to at least about 3.5%, and in D.P.G. uptake, e.g. to at least about 25%, occurs when the black is thus contacted with acid solutions of said concentrations and proportions. In many cases, especially at the higher concentrations and proportions of acid, the volatile content of the black may reach as high as 12% while the D.P.G. may increase to about 90% or even higher. The drying temperature may vary from about 150° F. to about 400° F. but temperatures from about 200° F. to about 350° F. are especially preferred. Such temperatures produce satisfactory percent volatiles on the black and do not significantly increase the nitrogen surface area or significantly affect the structure properties of the black.

We have found the optimum conditions of treatment with nitric acid to be the use of about equal parts by weight of black and nitric acid solutions having an $HNO_3$ concentration of between about 10 and 30% by weight and heating the resulting mixture at a temperature of around 250° F. until dry. Many manners of mixing the said solution with the black and many types of apparatus capable of doing same are contemplated within the scope of the present invention. For example, the acid solution may be used in place of the normal pelletizing liquid or otherwise added to a fluffy black at the time of pelletizing same. Thus, the black may be mixed with the solution in the pelletizing apparatus and allowed to become pelletized and subsequently dried in substantially regular equipment. Also, the desired surface characteristics can be achieved by reacting premoistened or slurried black with nitric acid or nitric oxide vapors in suitable concentrations and/or proportions at elevated temperatures, e.g. between about 200° F. and about 450° F. Such vapor phase treatment of furnace blacks with nitric oxide is also effective in producing blacks having the above-mentioned surface characteristics. Generally the treatment is accomplished by passing unheated mixtures of NO and air over the black while it is slowly rotated in a chamber heated to a temperature above 200° F. and preferably no higher than about 400° F. The black is then subjected to a purge cycle of air in order to remove entrapped or adhering vapors.

The critical surface characteristics may also be imparted to furnace blacks by contacting a stream of freshly generated ozone with the black at about room temperature or slightly higher for a sufficient length of time to permit interaction between the ozone and the carbon black. The ozone may be prepared by passing air or oxygen through a high voltage silent discharge or over mercury vapor or by any suitable method. Generally the best reaction conditions are obtained by contacting a slowly rotating shallow bed of the black of a few inches depth with a gas which contains from about 1% to about 10% ozone. The total amount of ozone reacted with black may range from amounts of from about 1 to about 10 lbs. of ozone per 100 lbs. of black, but usually amounts of from about 2 lbs. to about 8 lbs. per 100 lbs. of black are preferred. The time of contact will depend upon the concentrations and proportions of ozone and black, but usually times of from about 2 to about 12 hours are sufficient. The temperature should not exceed 300° F. and in most cases need be no higher than about 150° F.

In order that those skilled in the art may better understand and practice the present invention, the following examples are given. It is to be understood that these examples are illustrative in nature and in no way are they to be construed so as to limit the scope of the present invention beyond that imposed by the present specification and claims which appear hereinafter.

In the following examples all of the D.P.G. values are expressed as the percent of the total content of diphenylguanadine which is absorbed by a 0.5 gram sample of black from 100 mls. of a solution of diphenylguanadine in benzene which contains 211 mgs. diphenylguanadine per liter. The procedure is as follows: 0.5 gram of the black to be tested is shaken with 100 mls. of the above-mentioned solution for 30 minutes. The resulting slurry is then centrifuged and 40 mls. of the centrifugate is titrated with 0.002 N HCl (alcoholic) using bromophenyl blue as the indicator to determine the amount of D.P.G. which had not been taken up by the black. The D.P.G. uptake of a black is a good indication of the amount of strong acid groups on the surface of the black.

Example 1

Samples of Regal 600, a low modulus oil furnace black produced by Cabot Corporation and having the properties enumerated below were treated according to Procedures A, B and C, which are set forth in detail below:

Regal 600:
| | |
|---|---:|
| Nigrometer scale | 86 |
| $N_2SA$, $M^2/gm$. | 108 |
| Part. diam. millimicrons: | |
| (E.M.) | 23 |
| ($N_2SA$) | 30 |
| Oil abs. lbs. oil/100 lbs. blk. | 80 |
| Vol. content (percent) | 0.9–2.0 |
| pH | 7.6–8.5 |

Procedure A.—100 parts of Regal 600 were well mixed with 100 parts by weight of 10% nitric acid solution. The resulting mixture was dried overnight in an oven maintained at a constant temperature of 250° F.

Procedure B.—800 grams of Regal 600 were slowly rotated in a drum of 12″ by 6″ I.D. dimensions, which was heated to a temperature of about 250° F. Unheated vapors of NO and air were continually passed over the rotating bed of carbon black. The concentration of NO in the mixture of air and NO was about 5% by volume. The time of treatment with NO was about 4 hours. The black was then purged with air for about ¾ of an hour at 250° F.

Procedure C.—600 grams of Regal 600 were introduced to a Pyrex cylinder of 24″ by 4″ I.D. dimensions and rotated at 2 r.p.m. Pure dry $O_2$ was passed through an ozone generator at a flow rate of about 10 CFH where about 2% was converted to $O_3$, to give 3–4 grams $O_3$/hour. This stream was passed through the aftertreater at a temperature of 70–80° F. The treatment of the black continued for 10 hours.

The properties of each black were determined and the following data were obtained:

TABLE 1

| Black | Treatment | Percent volatile | pH | D.P.G. percent abs./0.5 gram | Acid No. |
|---|---|---|---|---|---|
| Regal 600 (control) | None | 1.5 | 7.7 | 8 | |
| 1708–46B | A | 6.6 | 2.7 | 46 | 8.7 |
| 1708–46C–1 | B | 5.3 | 2.8 | 39 | 9.8 |
| 1708–42C | C | 3.6 | 3.1 | 39 | 4.0 |

The above blacks were compounded with a butyl rubber stock according to the following procedure: The following ingredients were incorporated on a cold Banbury operating at 77 r.p.m. The batches were dumped one minute after attaining peak power.

| | Parts |
|---|---|
| Enjay Butyl 218 [1] | 100 |
| Stearic acid | 0.5 |
| Black | 50 |

[1] Enjay Butyl 218 is a copolymer of isobutylene and isoprene produced by Enjay Inc.

Each batch was then heat-cycled for 10 minutes at 300° F. on a 2-roll mill.

The following ingredients were then added to each batch and compounded on a roll mill at a temperature of about 120° F. to about 160° F.

| Ingredients: | Parts |
|---|---|
| Zinc oxide | 5.0 |
| Sulfur | 2.0 |
| "Altax" [1] | 1.0 |
| "Tuads" [2] | 1.0 |

[1] Altax is the trade name of R. T. Vanderbilt Co. for a benzothiazyl disulfide accelerator.
[2] Tuads is the trade name of R. T. Vanderbilt Co. for rubber vulcanizing control agents based on a mixture of tetraethylthiuram disulfide and tetramethylthiuram disulfide.

The resulting compounds were cured at 307° F. for 45 minutes. The following rubber data were obtained:

TABLE 2

| | Regal 600 | 1708–46B | 1708–46C–1 | 1708–48E–1 |
|---|---|---|---|---|
| Tensle Strength, p.s.i.: | | | | |
| Tested at R.T | 3,080 | 3,280 | 3,190 | 3,280 |
| Tested at 212° F | 1,070 | 1,320 | 1,420 | 1,350 |
| Modulus 300%, p.s.i.: | | | | |
| Tested at R.T | 1,110 | 1,180 | 940 | 960 |
| Tested at 212° F | 720 | 790 | 640 | 710 |
| Modulus 400%, p.s.i.: | | | | |
| Tested at R.T | 1,730 | 1,930 | 1,530 | 1,610 |
| Tested at 212° F | 990 | 1,180 | 940 | 1,030 |
| Elongation, percent: | | | | |
| Tested at R.T | 600 | 600 | 680 | 630 |
| Tested at 212° F | 420 | 440 | 590 | 490 |
| Tear Resistance, lbs./inch of thickness: | | | | |
| Tested at R.T | 195 | 191 | 205 | 208 |
| Tested at 212° F | 118 | 104 | 154 | 147 |
| Goodyear Healy Rebound, percent recovered energy: | | | | |
| Tested at R.T | 33.5 | 34.4 | 33.9 | 33.4 |
| Tested at 212° F | 67.9 | 74.6 | 72.1 | 72.9 |
| Shore A2 Hardness | 62 | 51 | 51 | 56 |
| Akron angle abrasion volume index | 268 | 209 | 198 | 207 |
| Demattia flex., K.C. Req. to 1″ | 10 | 17 | 38 | 25 |
| Torsional hysteresis, "K" log decrement at 100° C | .454 | .173 | .396 | .320 |

It will be obvious to those well skilled in the art that the butyl compositions comprising the blacks having the properties which we have discovered to be critical are not only generally stronger than the composition containing the untreated black, but also such compositions are softer and possess better elastic properties.

Example 2

Representative samples of an oil furnace carbon black having a nitrogen surface area of about 115 square meters per gram, an electron microscope diameter of about 23 millimicrons and an oil absorption value of about 125 pounds of oil per 100 pounds of black were treated with $HNO_3$ solutions of varying concentrations by adding 110 parts of each $HNO_3$ solution to 100 parts by weight of the black in a glass vessel. The resultant cake was stirred well and then pushed through an 8 mesh screen to break up any large lumps. The damp granules were then dried for 24 hours at 250° F. in a carefully controlled forced air oven. A total of 750 grams of black was made for each acid concentration in the series 0, 5, 10, 12.5, 15 and 25% $HNO_3$ by weight. One batch was also made using 220 parts of 25% $HNO_3$ solution per 100 parts by weight of black.

The properties of the resulting blacks were determined and the following data were obtained:

TABLE 3.—ANALYTICAL EVALUATION OF VULCAN 6 TREATED WITH $HNO_3$ OF VARIOUS CONCENTRATIONS

| | Concentration of $HNO_3$ solution used, percent | Percent volatile | DPG percent ads./0.5 gram | pH | Acid No. mg. KOH/ gram | $N_2SA$ $M^2/g$ |
|---|---|---|---|---|---|---|
| Identification: | | | | | | |
| (V–1510–2) | Control | 1.3 | 9 | 8.0 | | 112 |
| 3284–16 | 5 | 3.9 | 42 | 3.00 | 5.4 | 114 |
| 3284–13 | 10 | 4.9 | 58 | 2.70 | 8.4 | 118 |
| 3284–18 | 12.5 | 5.1 | 60 | 2.70 | 8.7 | 116 |
| 3284–14 | 15 | 5.6 | 62 | 2.55 | 10.4 | 129 |
| 3284–17 | 25 | 6.2 | 74 | 2.50 | 12.5 | 122 |
| 3284–28 | [1] 25 | 5.7 | 57.5 | 2.31 | 12.1 | 135 |

[1] All batches were made with 110 parts $HNO_3$ sol per 100 parts black except this one where 220 parts $HNO_3$ sol per 100 parts black were used.

The above blacks were compounded into butyl rubber in accordance with the recipe and procedures set forth in Example 1. The following data were obtained for vulcanizates which were cured at 307° F. for 45 minutes.

TABLE 4

|  | V-1510-2 control | 3284-16 | 3284-13 | 3284-14 | 3284-17 | 3284-28 |
|---|---|---|---|---|---|---|
| HNO₃ concentrations, percent | | 5 | 10 | 15 | 25 | 25 |
| Tensile, p.s.i. at R.T | 2,900 | 3,100 | 3,200 | 3,300 | 3,350 | 3,400 |
| Modulus at 300%, p.s.i. at R.T | 1,410 | 1,830 | 1,900 | 1,900 | 1,900 | 1,900 |
| Modulus at 400%, p.s.i. at R.T | 2,100 | 2,700 | 2,700 | 2,710 | 2,750 | 2,750 |
| Elongation, percent at R.T | 540 | 470 | 480 | 510 | 510 | 510 |
| Shore A Hardness | 65 | 65 | 63 | 63 | 62 | 60 |
| Torsional hysteresis, "K" log decrement at 100° C | 0.457 | 0.352 | 0.297 | 0.282 | 0.262 | 0.246 |

It will be obvious that a substantial degree of improvement in tensile strength and hysteresis, for example, is effected in vulcanized butyl compositions when there is utilized as the filler therein a furnace black which has been treated with as little as 5.5 parts of HNO₃ per 1000 parts of black.

We find that aqueous solutions of HNO₃ are the most satisfactory reactant for imparting those surface characteristics to blacks which in turn impart outstandingly improved properties to filled vulcanizates of relatively saturated elastomers. The availability, ease of treatment, and effectiveness of the nitric acid especially recommends this agent for the practice of the present invention. Accordingly, the preferred embodiment of this invention comprises relatively saturated elastomeric compositions containing as a filler therein—generally from at least 20 to about 100 parts thereof—an oil furnace black which has been reacted at temperatures below 450° F. with an aqueous solution containing from about 5 parts of HNO₃ per 100 parts of black to about 50 parts HNO₃ per 100 parts of black.

Example 3

Regal 300 is a low modulus oil furnace carbon black produced by Cabot Corporation and has a nitrogen surface area of about 84 square meters per gram, an electron microscope particle diameter of about 25 millimicrons and an oil absorption factor of about 90 pounds of oil per hundred pounds of black. 125 pounds of Regal 300 were mixed with 24 pounds of 70% nitric acid solution and 90 pounds of water in a pin type pelletizer. The pellets were subsequently dried in a rotary drum dryer for about 12 hours at temperatures of about 250° F. For the last half hour the pellets were dried at a temperature of 300° F. The black produced by the above-mentioned procedure and an untreated Regal 300 had the following properties:

|  | Percent volatile | pH | DPG percent abs./ 0.5 g. | Acid No. |
|---|---|---|---|---|
| SX 750 acid treated Regal 300 | 4.2 | 3.1 | 34 | 5.5 |
| G.P. 480 non-treated Regal 300 | 1.0 | 8.5 | | |

A sample of the above-mentioned acid treated Regal 300 was compounded into butyl rubber in accordance with the recipe and procedures set forth in Example 1 and compared with a butyl rubber composition compounded in an identical manner but containing the untreated Regal 300 as the black therein. The following data were obtained for vulcanizates which had been cured at 307° F. for 45 minutes.

TABLE 5

|  | G.P. 480 | Sx 750 |
|---|---|---|
| Tensile Strength, p.s.i.: | | |
| Tested at R.T | 2,930 | 3,260 |
| Tested at 212° F | 1,240 | 1,320 |
| Modulus 300%, p.s.i.: | | |
| Tested at R.T | 1,170 | 970 |
| Tested at 212° F | 800 | 730 |
| Modulus 400%, p.s.i.: | | |
| Tested at R.T | 1,820 | 1,570 |
| Tested at 212° F | 1,090 | 1,060 |
| Elongation, percent: | | |
| Tested at R.T | 560 | 630 |
| Tested at 212° F | 440 | 470 |
| Tear Resistance, lbs./inch of thickness: | | |
| Tested at R.T | 182 | 195 |
| Tested at 212° F | 119 | 109 |
| Goodyear Healy Rebound, percent recovered energy: | | |
| Tested at R.T | 34.6 | 34.1 |
| Tested at 212° F | 69.7 | 72.4 |
| Shore A2 Hardness | 62 | 53 |
| Akron angle abrasion volume index | 280 | 240 |
| Demattia flex., K.C. req. to 1" | 16 | 32 |
| Torsional hysteresis, "K" log decrement at 100° C | .456 | .324 |

Example 4

Samples of Regal 600 a furnace black having an oil absorption factor of about 80 lbs. oil/100 lbs. black and an average E.M. particle diameter of about 23 millimicrons were treated with HNO₃ solutions of the varying concentrations listed in Example 2 above and in accordance with the procedure set forth there. The following data were obtained:

TABLE 6.—ANALYTICAL EVALUATION OF REGAL 600 TREATED WITH HNO₃ OF VARIOUS CONCENTRATIONS

|  | Concentration of HNO₃ 110 HNO₃/ 100 black, percent | Volatile, percent | DPG percent ads./ 0.5 gram | pH | Acid No., mg. KOH/g. | N₂SA M²/g. |
|---|---|---|---|---|---|---|
| Identification: | | | | | | |
| Regal 600 | (¹) | 1.9 | 6 | 7.6 | | 95.6 |
| 3284-35 | 5 | 3.8 | 36 | 3.3 | 3.1 | |
| 3284-34 | 10 | 4.9 | 43 | 2.9 | 5.8 | |
| 3284-22 | 15 | 5.7 | 42 | 3.2 | 6.4 | |
| 3284-20 | 25 | 6.6 | 47 | 3.2 | 7.6 | 96.4 |
| 3284-31 | (²) | 7.6 | 59 | 2.4 | 11.4 | 105 |

¹ Control (3284-19).
² 220 parts of 25%.

The above blacks were compounded with butyl rubber in accordance with the procedures set forth in Example 1. The properties of the resulting vulcanizates which were cured at 307° F. for 45 minutes were determined. The following data were obtained:

TABLE 7

|  | 3284-19 (Control) | 3284-35 | 3284-34 | 3284-22 | 3284-20 | 3284-31 |
|---|---|---|---|---|---|---|
| $HNO_3$ concentration, percent |  | 5 | 10 | 15 | 25 | 25 |
| Tensile, p.s.i. at R.T | 2,770 | 3,050 | 3,100 | 2,970 | 2,980 | 3,200 |
| Modulus 300%, p.s.i. at R.T | 1,210 | 1,340 | 1,510 | 1,180 | 1,200 | 1,000 |
| Modulus 400%, p.s.i. at R.T | 1,840 | 2,200 | 2,340 | 1,910 | 1,970 | 1,820 |
| Elongation, percent at R.T | 540 | 520 | 520 | 550 | 550 | 600 |
| Shore A Hardness | 70 | 65 | 64 | 63 | 63 | 60 |
| Torsional hysteresis, "K" log decrement at 100° C | 0.446 | 0.291 | 0.242 | 0.254 | 0.223 | 0.195 |
| Goodrich flex., Oven, 212° F.; Stroke, 175; Load, 143; Time, 20 minutes: |  |  |  |  |  |  |
| Percent static compression | 20.6 | 21.2 | 22.7 | 23.8 | 25.0 | 26.5 |
| Percent dynamic compression | 20.4 | 21.4 | 14.4 | 15.9 | 16.1 | 18.6 |
| Percent permanent set | 27.0 | 19.1 | 19.3 | 22.4 | 24.4 | 25.8 |
| Heat build up, ° F | 63 | 54 | 56 | 58 | 65 | 78 |

The superiority of the butyl compositions containing the blacks having the properties which we have found to be critical will be obvious at a glance. For example, note that the butyl composition containing Regal 600 which has been treated with a solution of 15% $HNO_3$ (3284-22) has a higher tensile, higher percent elongation, lower modulus, lower hardness, lower hysteresis and lower heat build up than the corresponding composition made with untreated Regal 600. Such improvements impart to the product superior elastic properties and enhance the qualifications of butyl compositions as general purpose rubber stock.

It should also be added that the results obtained with the blacks which are contemplated within the scope of the present invention are quite surprising in view of state of the art. For example, it is known that oxidation of furnace blacks with molecular oxygen generally causes a considerable increase in surface area which could result in undesirable rubber properties. For example, such an increase in surface area in combination with the usual concomitant decrease in pH and increase in DPG would normally tend to retard curing and either require excessive amounts of curing agents or require extremely long curing times or both. On the contrary, Tables 3 and 6 show that, in the present case, no appreciable change in surface area occurs and the rubber data of Examples 1, 2 and 3 clearly indicate that the acidity of the black unexpectedly improves rather than hinders the physical properties of the vulcanizates with no appreciable increase in curing time and no substantial increase in the amounts of curing agents required.

A portion of each of the samples of the blacks of Table 5 above was also incorporated with butyl rubber in accordance with the procedure set forth in Example 1 but with the heat cycling step recited therein omitted. The properties of the resulting vulcanizates cured at 307° F. for 45 minutes were as follows:

TABLE 8

|  | 3284-19 | 3284-35 | 3284-34 | 3284-22 | 3284-20 | 3284-31 |
|---|---|---|---|---|---|---|
| $HNO_3$ concentration, percent | Control | 5 | 10 | 15 | 25 | 25 |
| Tensile, p.s.i. at R.T | 2,850 | 3,100 | 3,260 | 3,100 | 3,140 | 3,260 |
| Modulus 300%, p.s.i. at R.T | 1,040 | 1,030 | 1,000 | 960 | 920 | 790 |
| Modulus 400%, p.s.i. at R.T | 1,740 | 1,840 | 1,770 | 1,570 | 1,540 | 1,340 |
| Elongation, percent at R.T | 570 | 580 | 620 | 640 | 640 | 690 |
| Shore A Hardness | 69 | 64 | 64 | 64 | 62 | 60 |
| Torsional hysteresis, "K" log decrement at 100° C | 0.444 | 0.418 | 0.355 | 0.349 | 0.302 | 0.281 |
| Goodrich flex., Oven, 212° F.; Stroke, 175; Load, 143; Time, 20 min.: |  |  |  |  |  |  |
| Percent static compression | 20.6 | 19.9 | 22.6 | 22.6 | 25.3 | 27.5 |
| Percent dynamic compression | 18.4 | 14.2 | 14.7 | 15.4 | 14.6 | 20.3 |
| Percent permanent set | 25.7 | 19.2 | 20.0 | 22.4 | 22.3 | 29.0 |
| Heat build up, ° F | 54 | 46 | 47 | 48 | 48 | 61 |

It will be noted from the above data that not only are the properties of the butyl compositions containing the blacks of our invention improved substantially but also some of the properties such as tensile and modulus are superior to those of the heat-treated compositions of Table 7. Accordingly, some of the blacks, especially the low temperature oxidized, low modulus blacks of our invention are capable of imparting a high degree of improvement for most properties of butyl compositions without the necessity of heat cycling.

Example 5

Rubber compounds based on a sulfur curable elastomeric terpolymer of ethylene, propylene and a minor amount of 2-cyclopentadiene were prepared as follows:

| Composition 1 | | Composition 2 | |
|---|---|---|---|
| Ingredients | Parts | Ingredients | Parts |
| Polymer | 100 | Polymer | 100 |
| ZnO | 5 | ZnO | 5 |
| Regal 600 (CL-42) | 50 | 1708-46B [1] | 50 |
| "Necton 60" | 20 | "Necton 60" [2] | 20 |
| "Captax" | 0.5 | "Captax" [3] | 0.5 |
| "Thionex" | 1.5 | "Thionex" [4] | 1.5 |
| Sulfur | 1.5 | Sulfur | 1.5 |

[1] 1708-46B is a nitric acid treated Regal 600. Its properties are listed in Table 1 of Example 1.
[2] "Necton 60" is a trade name of Humble Oil & Refinery Co. for a rubber processing oil comprising a mixture of naphthalenes and paraffins.
[3] "Captax" is a trade name of R. T. Vanderbilt Co. for an accelerator based on mercaptobenzothiazole.
[4] "Thionex" is a trade name of E. I. du Pont de Nemours and Co. for an accelerator based on tetramethylthiuram monosulfide.

The procedure involved in compounding the above ingredients was as follows:

On a Banbury at 120 F.

Time (minutes)
Add polymer, stearic, ZnO and ½ black _____ 0
Add ½ black and all "Necton 60" _____ 2
Dump and sheet out _____ 4

The resulting composition was then divided in two batches. One batch was heat-treated for 10 minutes on a Banbury at 310° F. The other batch was milled for 10 minutes on a cold Banbury.

The remaining ingredients were then added to both batches on a mill at 120° F.

The compositions were cured at 307° F. for 40 minutes. The properties of the resulting vulcanizates were determined. The following data were obtained:

TABLE 9

|  | Heat treated | | No heat treatment | |
|---|---|---|---|---|
|  | Composition 1 | Composition 2 | Composition 1 | Composition 2 |
| Tensile strength, p.s.i. at R.T | 1,840 | 2,500 | 2,110 | 2,450 |
| Modulus 300%, p.s.i. at R.T | 900 | 800 | 890 | 630 |
| Modulus 400%, p.s.i. at R.T | 1,510 | 1,420 | 1,580 | 1,080 |
| Elongation, percent at R.T | 450 | 540 | 470 | 610 |
| Shore A2 Hardness | 59 | 59 | 59 | 59 |

It is obvious from the above data, that blacks having properties which we have discovered to be critical impart higher tensiles and lower modulus values to the substantially saturated rubbers in which they are utilized. By substantially saturated rubbers, we mean those elastomers which contain a degree of unsaturation no greater than about 10 mole percent. Especially included in this term are the newer substantially saturated synthetic elastomers such as those produced by the copolymerization of ethylene, propylene, butene or other α-monoolefins with minor amounts of a conjugated diene or other diolefins. Such elastomers generally have degrees of unsaturation no greater than about 5 mole percent and most have less than about 3 mole percent.

Since the essence of our invention resides in the discovery that low structure furnace carbon blacks having specific surface characteristics and properties which have been imparted thereto solely by chemical oxidizing agents, impart surprising improvements to substantially saturated elastomeric stocks, many modifications may be introduced without departing from the spirit and scope thereof. For example, although as illustrated in the previous examples, 50 parts of black generally impart optimum reinforcing properties to the elastomers of interest to the present invention, nevertheless any amounts from about 10 parts to about 100 parts of black per 100 parts of elastomer will impart a significant degree of reinforcement with amounts of from about 20 to 70 parts of black being especially preferred. Further, various curing agents and systems and techniques may be utilized to cure the composition of the present invention. Also, many other ingredients such as oils, accelerators, and others compounding ingredients well known to those skilled in the art, may be utilized and included in the compositions embraced within the scope of our invention.

Having described our invention together with preferred embodiments thereof, what we declare as new and desire to secure by U.S. Letters Patents is as follows:

1. A process for making furnace carbon black which is especially useful as a reinforcing filler in relatively saturated synthetic elastomers comprising
   (a) converting a hydrocarbon raw material to carbon black in a furnace operated under conditions such as to insure the formation of carbon blacks inherently having a low degree of structure as indicated by an oil absorption factor below about 115 lbs. oil per 100 lbs. of black and recovering said carbon black from the furnace effluent;
   (b) then subjecting said carbon black so recovered to treatment at a temperature of less than about 450° F. with a chemical oxidizing agent selected from the group consisting of nitric acid, nitrogen oxides, ozone and mixtures thereof until the pH of said black has been reduced to around 4 or below, the volatile content has been increased to about 3% by weight or more and the diphenyl guanidine uptake for a 0.5 gm. sample of said black has been raised above about 25%; and
   (c) recovering the so-modified carbon black resulting from said treatment.

2. The process of claim 1 in which the furnace operation of step (a) is carried out under such conditions as to produce a carbon black having an oil absorption value of below about 100 lbs. of oil per 100 lbs. of black.

3. The process of claim 1 in which an alkali metal is introduced in small concentration into the carbon forming zone of the furnace of step (a) in order to help insure the formation of inherently low structure carbon black therein.

4. The process of claim 1 wherein the chemical oxidizing agent used in treatment step (b) is a dilute aqueous nitric acid solution which is used in amounts sufficient to wet the black uniformly and to supply from about 5 to about 60 parts by weight of $HNO_3$ per 100 parts of black.

5. The process of claim 4 in which the concentration of $HNO_3$ in the dilute nitric acid solution is between about 5 and about 50% by weight.

6. The process of claim 4 in which recovery step (c) involves forming the wetted carbon blacks into pellets and drying said pellets at temperatures of about 150° F. to about 400° F. to remove moisture, excess treating agent and extraneous volatile by-products.

7. The process of claim 6 in which the drying temperatures are between about 200 and about 350° F.

8. A process for producing furnace carbon blacks having relatively low structure and pH, which comprises charging a hydrocarbon feedstock containing at least about 1 p.p.m. by weight of an alkali metal having an atomic number of at least 19 to a carbon black furnace under conditions assuring production of a carbon black having an oil absorption value of not more than about 100 pounds of oil per 100 pounds of black; recovering carbon black from effluent gases; and contacting said carbon black with an amount of nitric acid sufficient to reduce the pH of the carbon black to a value of not more than about 4.

9. The process of claim 8 wherein the carbon black is contacted with about an equal amount by weight of water containing about 5 to 50 weight percent of nitric acid and is then dried at a temperature below about 400° F.

10. A process for producing furnace carbon blacks having relatively low pH structure and modulus properties which process comprises
   charging a hydrocarbon feedstock to a carbon black furnace operated under conditions to produce carbon black having an oil absorption value of not more than about 100 pounds of oil per 100 pounds of black;
   recovering carbon black from the effluent gases;
   contacting the carbon black from said furnace with an amount of nitric acid sufficient to reduce the pH of the carbon black to a value in the range of about 1.5 to 4;
   adding about an equal amount of pelleting water to the carbon black;
   pelleting the carbon black in a pelleting step;
   drying the pelleted black at a temperature of about 200° F. to about 400° F.;
   and recovering the carbon black so produced.

11. The process of claim 10 wherein the carbon black is produced in the presence of about 10 to 1000 p.p.m. of potassium and is contacted with about 10 to 30 weight percent of nitric acid.

12. The process of claim 10 wherein the acid is added to the pelleting water in the pelleting step.

References Cited

UNITED STATES PATENTS

| | | | |
|---|---|---|---|
| 2,682,448 | 6/1954 | Cines | 23—209.1 |
| 3,010,794 | 11/1961 | Friauf et al. | 23—209.4 |
| 3,023,118 | 2/1962 | Donnet | 106—307 |
| 3,024,092 | 3/1962 | Gessler | 23—209.2 |
| 3,050,378 | 8/1962 | Kron | 23—314 |
| 3,245,820 | 4/1966 | Melore et al. | 106—307 |
| 3,247,003 | 4/1966 | Pollock | 106—307 |
| 2,479,708 | 8/1949 | Amon | 23—209.1 |
| 2,420,810 | 5/1947 | Bray et al. | 23—209.1 |
| 3,010,795 | 11/1961 | Friauf et al. | 23—209.4 |

EDWARD J. MEROS, Primary Examiner

U.S. Cl. X.R.

23—209.2; 260—41